Patented Apr. 2, 1929.

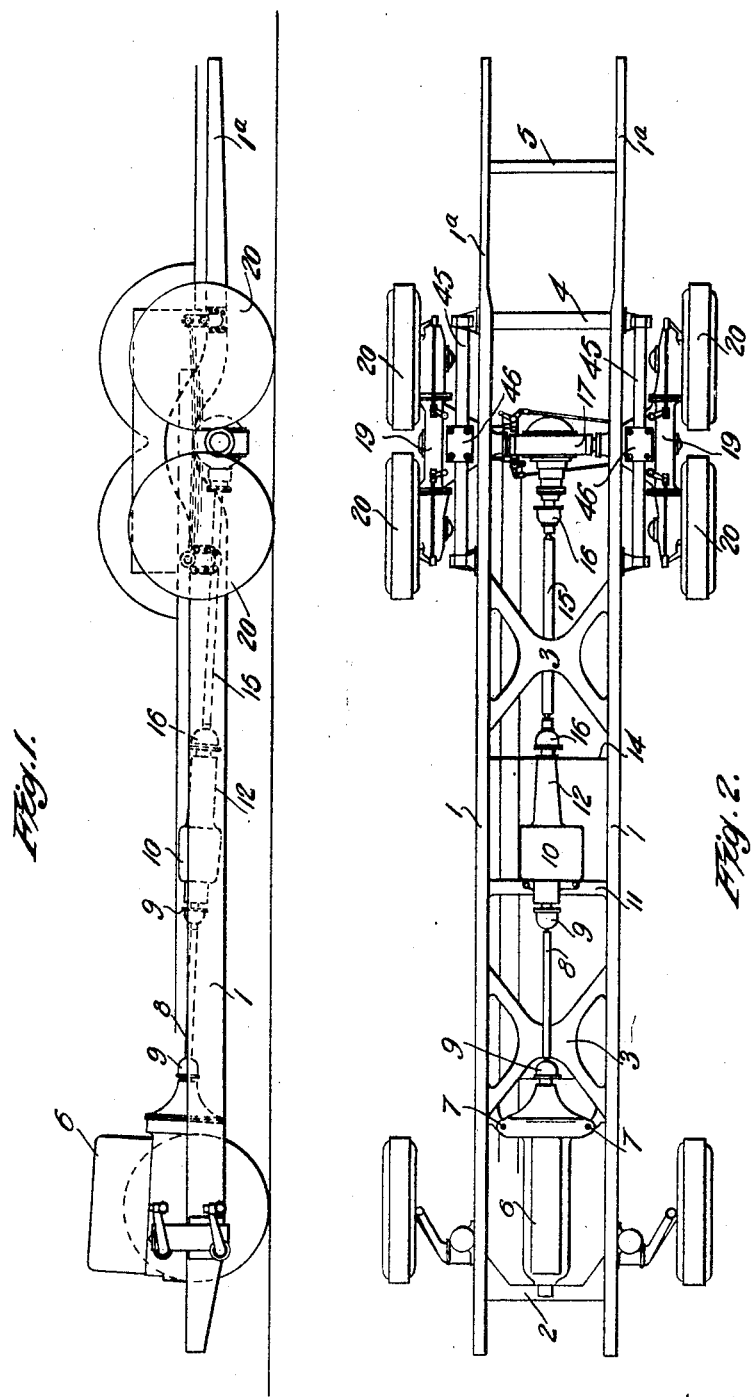

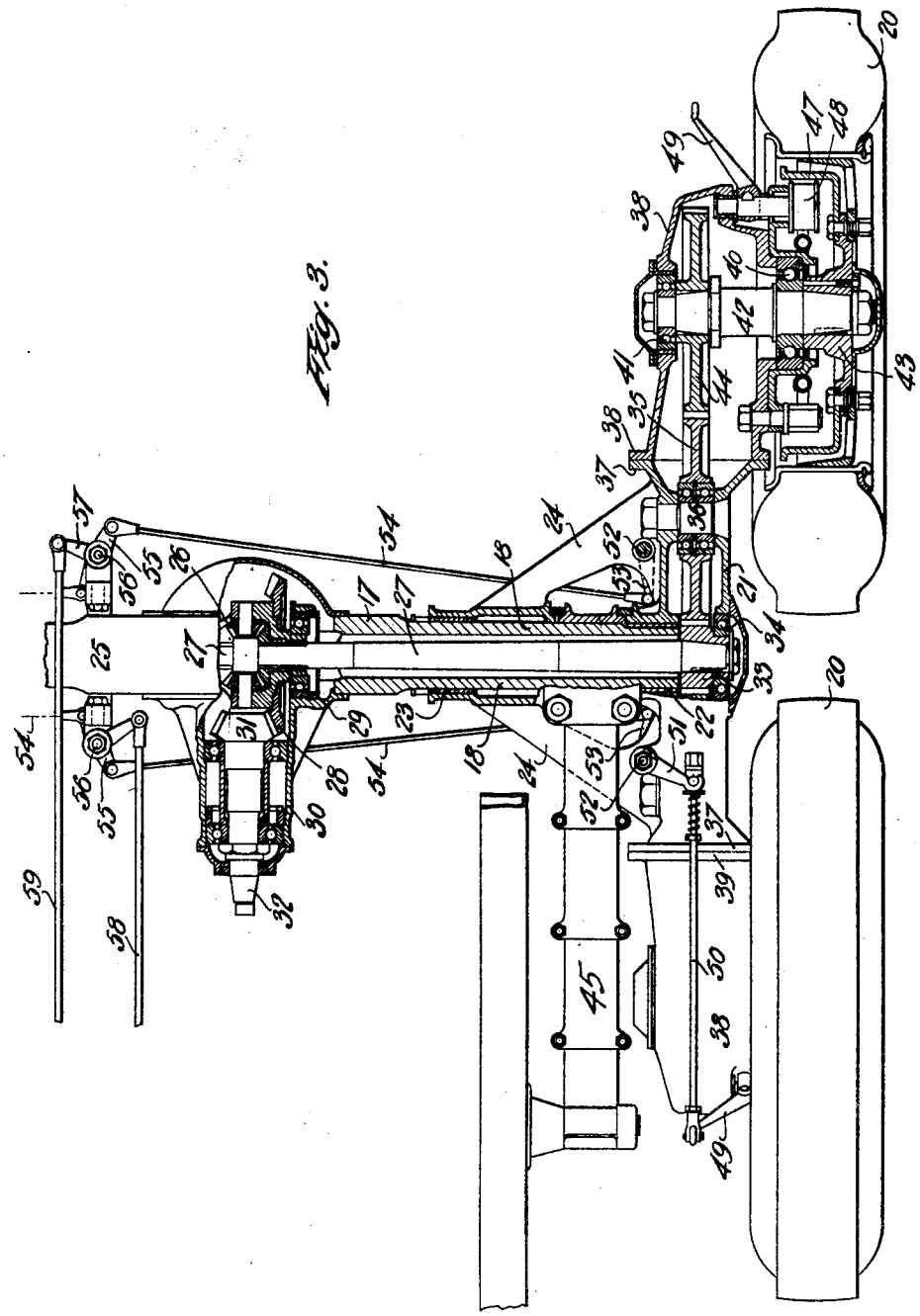

1,707,535

UNITED STATES PATENT OFFICE.

OLIVER DANSON NORTH, OF LONDON, ENGLAND, ASSIGNOR TO SCAMMELL LORRIES LIMITED, OF LONDON, ENGLAND.

MULTIPLE-WHEEL DRIVE FOR VEHICLES.

Application filed June 20, 1927. Serial No. 202,709.

This invention relates to motor vehicles having multiple driving wheels and comprises an arrangement of driving mechanism by which more than the usual two driving wheels are arranged in a unit so that the driving effort is distributed between them. The wheels are mounted at the ends of balance arms which constitute enclosing and supporting casings for the distributing gear. The balance arms are supported so as to be able to oscillate about the ends of an axle casing connected to the vehicle frame by suitable springs. Power is transmitted to axles within the casing through the usual driving mechanism. The balance arms are provided with secondary bearings engaging the axle casing a considerable distance from its ends and connected to the balance arms by inwardly extending webs. Brakes are provided which act on each of the driving wheels and are operated through the medium of transverse members connected at one end to mechanism mounted on the axle casing near its centre and at the other end to mechanism mounted on the balance arms, these transverse members being kept close to the axle casing and approximately parallel with the axis thereof. By this means, the oscillating movement of the balance arms about the axle casing does not materially affect the operation of the brakes.

A suitable embodiment of my invention will now be illustrated in the accompanying drawings, which show it applied to a motor-bus chassis and in which:—

Fig. 1 is a side elevation of a motor vehicle chassis provided with multi-wheel driving mechanism according to my invention and suitable for use as a motor-bus chassis.

Fig. 2 is a plan thereof, and

Fig. 3 is a half plan of the driving mechanism partly in section.

Referring to the drawings, the chassis comprises a pair of longitudinal frame members 1 connected by a front transverse member 2, a pair of X-shaped cross members 3 and other transverse bars 4 and 5 between the extending rear ends 1ª of the frame members. At the front of the chassis is supported the power unit 6, its front end being secured to the cross member 2 whilst its rear end is held at two points 7 thus forming a three-point method of suspension.

A short clutch shaft 8 transmits the power through flexible joints 9 to a gear box 10. This is mounted at its front end upon a transverse member 11 and is provided with an extended main shaft bearing 12 at its rear end which is supported in a light transverse support 14. From the main shaft of the gear box the power is transmitted through a propeller shaft 15 having flexible or universal connections 16 at its two ends. The rear end of the propeller shaft 15 is connected to the usual driving mechanism within an axle housing 17, the outwardly extending ends 18 of which support balance arms 19 in the ends of which are supported the driving wheels 20.

Each balance arm 19 comprises a centre section 21 having a bearing 22 which engages around the outer end of the extension 18 of the axle housing 17. A second bearing 23 engages the extension 18 of the axle housing 17 at a considerable distance from the balance arm 19 and close in towards the middle of the axle housing 17. This bearing 23 is connected to the centre section 21 of the balance arm 19 by means of inwardly extending webs 24.

The axle housing 17 is here shown of the banjo type having the centre drum-shaped portion 25 and the extensions or sleeves 18 formed in one piece. Within the centre drum-shaped portion 25 of the axle casing 17 is provided the usual form of driving mechanism comprising a differential driving gear 26 which engages the inner ends of a pair of driving axles 27 and also carries a crown bevel wheel 28. To the front of the drum-shaped portion 25 of the axle housing 17 is secured a cover plate 29 supporting a bearing sleeve 30 for the bevel pinion 31 whose short shaft 32 is coupled to the propeller shaft 15 by the universal joint 16 already referred to.

The two driving axles 27 project from the ends 18 of the axle housing into the centre section 21 of the balance arms 19 and support the main distributing toothed pinions 33. An anti-friction bearing 34 supports the end of the driving axle in the outer face of the centre section 21. Each main distributing pinion 33 gears with a pair of intermediate toothed wheels 35 mounted on stationary axle pins 36 arranged respectively in front and behind the driving axle 27.

The front and rear ends of the centre section 21 of the balance arms are provided with flanges 37 by means of which end sections 38 having similar flanges 39 are bolted thereto. In these end sections 38 are provided anti-friction bearings 40 and 41 for the wheel axles 42. The wheel hubs 43 are mounted directly upon the outer ends of the wheel axles 42 whilst the portion of the wheel axle 42 within the end sections of the balance arm casing supports a toothed gear 44 which gears with the intermediate gear wheel 35. By this means rotation of the driving axles 27 will be transmitted through the main distributing pinions 33 and the intermediate gear wheels 35 to the toothed wheels 44 mounted directly on the wheel axles so that power will be transmitted to all the driving wheels 20 mounted in the ends of the balance arms 19. All four of the driving wheels 20 will thus take their part in driving the vehicle as well as in supporting the load, whilst the balance arms may oscillate about the main axle casing so as to permit these wheels to readily accommodate themselves to irregularities in the surface over which the vehicle is being driven.

The chassis frame members 1 are supported on the main axle casing 17 by springs 45 whose ends are connected to the frame members 1, whilst their centres are secured to spring pads 46 mounted upon the extending sleeve members 18 of the axle 17 between the bearings 22 and 23 of the centre section 21 of the balance arms.

Each of the driving wheels 20 is provided with a brake drum 47 within which are mounted suitable brake shoes adapted to be engaged therewith by cams 48 adapted to be actuated by brake cam shaft levers 49. From these brake cam shaft levers 49 pull rods 50 extend to levers 51 on the upper end of short shafts 52 journalled in bearings in the centre section 21 of the balance arms 19. On the other end of these shafts 52 are provided levers 53 extending toward the main axle casing 17. Transverse pull rods or cables 54 extend from these levers 53 to bell crank levers mounted on the axle casing 17 near the centre thereof. The pull rods or cables 54 of the front wheels on opposite sides of the vehicle are connected to opposite ends of a double-ended lever 55 mounted on a vertical shaft 56 journalled in a bearing supported by the main axle housing 17. This shaft 56 may be rotated by a lever 57 adapted to be operated by a main pull rod 58 extending to suitable brake operating mechanism such as a hand brake lever, and may be actuated either direct or through suitable "servo" brake mechanism i. e. mechanism constructed to utilize the rotation of the road wheels or other source of power to apply the brakes under the control of the pedal or hand lever so as to enable a strong braking effort to be applied without undue muscular effort. The two rear wheel brakes are connected by their pull rods or cables 54 to a double-ended lever 55 mounted on a shaft 56 and having an operating lever 57 adapted to be actuated by a pull rod 59 which extends to suitable brake operating mechanism such as a foot brake pedal either direct or through suitable "servo" brake mechanism.

Multiple wheel driving mechanism for motor vehicles according to this invention permits the tractive effort of the power unit to be distributed to a greater number of driving wheels than normal, thus obtaining better road adhesion. This will enable heavy loads to be effectively supported whilst keeping down the load per wheel, and enabling an effective drive to be obtained with very heavy loads and over comparatively unsuitable ground. The arrangement of the driving wheels upon balance arms adapted to oscillate about the main driving axle permits the driving wheels to move freely so as to accommodate themselves to irregular road surfaces, whilst continuing to transmit the drive. Any upward movement caused by a wheel mounting over an obstacle will cause the balance arm to turn about the main driving axle, whilst the axle of the other wheel will act as a fulcrum for the balance arm. In this manner the displacement of the main driving axle caused by any road obstruction will be greatly reduced compared with the movement which would be caused if the wheel were mounted directly on the driving axle. It is therefore possible to obtain greatly enhanced springing and insulation from road shocks in a vehicle provided with driving mechanism according to this invention. The arrangement of brakes in all the driving wheels also enables a very strong braking effort to be exerted when desired.

I claim:—

In a multiple wheel driving mechanism, a main axle for vehicle housing, balance arms in the form of gear casings journalled on the ends of said axle housing and having inner extended bearings on said axle housing and inwardly extending webs for connecting said extended bearings to said balance arms, driving axles journalled in said axle housing and in said balance arms, trains of meshing toothed wheels enclosed within said balance arms for driving said road wheels from said driving axles and spring pads mounted on said main axle housing between said inner extended bearings and said balance arms.

OLIVER DANSON NORTH.